(No Model.)
J. O. FERGUSON.
THILL COUPLING.
No. 466,059. Patented Dec. 29, 1891.
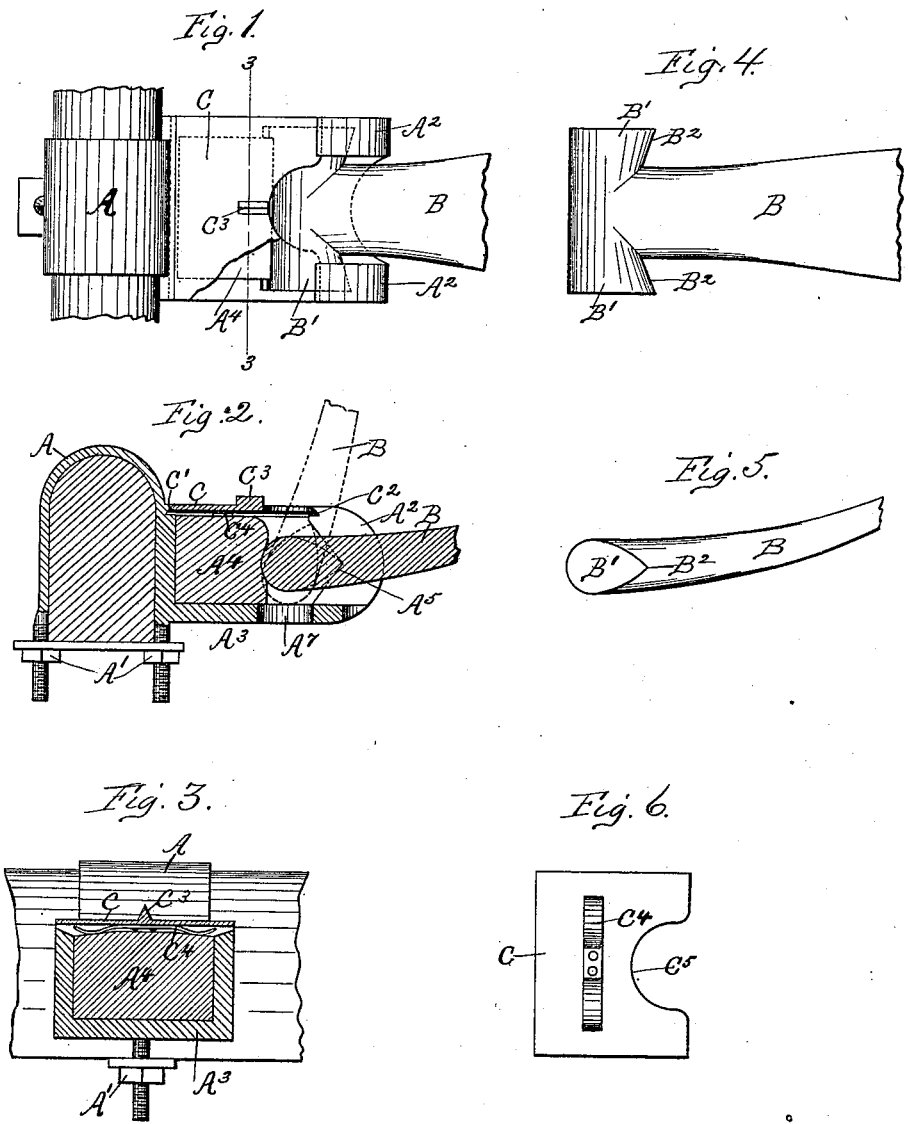

UNITED STATES PATENT OFFICE.

JAMES O. FERGUSON, OF GREENWICH, NEW YORK, ASSIGNOR OF TWO-THIRDS TO JACOB A. RICH, OF SAME PLACE.

THILL-COUPLING.

SPECIFICATION forming part of Letters Patent No. 466,059, dated December 29, 1891.

Application filed February 16, 1891. Serial No. 381,530. (No model.)

*To all whom it may concern:*

Be it known that I, JAMES O. FERGUSON, a citizen of the United States, residing at Greenwich, county of Washington, and State of New York, have invented certain new and useful Improvements in Thill-Couplings, of which the following is a specification.

My invention relates to such improvements; and it consists of the novel construction and combination of parts hereinafter described and subsequently claimed.

Reference may be had to the accompanying drawings and the letters of reference marked thereon, which form a part of this specification.

Similar letters refer to similar parts in the several figures therein.

Figure 1 is a top plan view of my improved thill-coupling. Fig. 2 is a vertical central longitudinal section of the same. Fig. 3 is a vertical cross-section of same, taken on the broken line 3 3 in Fig. 1. Fig. 4 is a top plan view of the thill-iron detached. Fig. 5 is a view of same in side elevation. Fig. 6 is a bottom plan view of the detachable plate detached.

A is the common well-known clip adapted to be bolted onto a wagon-axle in the usual manner, as by nuts A'. Secured to or forming a part of one leg of the clip is the body part of the coupling, provided on its projecting end with the ears $A^2$, adapted to engage with the T-shaped head of the thill-iron B. The ears are united at their lower edges by the connecting-plate $A^3$, which serves not only to prevent the ears from spreading, but to form a chamber between the ears and such plate adapted to receive and support a rubber cushion $A^4$ to engage with the head of the thill-iron and maintain its laterally-projecting T-arms in contact with the ears. The T-arms B' are provided on their front side with a knife-edge $B^2$, which edges, together with the inner V-shaped portion $A^5$ of the ears, form the bearing parts of the coupling. The rubber cushion maintains the bearing-surfaces in continuous engagement with each other and there is no rattle of the parts. When the ordinary journal and socket bearings are employed, the continuous vertical movement of the thills while in use causes the bearing parts to move upon each other, which quickly wears and loosens the bearing parts; but the knife-edge bearing prevents such movement of the bearing parts and materially reduces or wholly prevents the wear of such parts. By projecting the outer ends of the knife-edges forward, as shown in Fig. 4, I produce a hook-shaped edge on each arm, and by giving the bearing-surface of the ears a similar or undercut form, as indicated by the dotted lines in Fig. 1, the draft-tension exerted upon the bearings tends to draw the ears inward toward each other, rendering it impossible to spread them by draft-tension.

I am able to attach and detach the thill-irons to and from the coupling without the use of bolts or any tools to loosen any of the parts. To attach the thills it is only necessary to raise them to an approximately perpendicular position, as indicated by the dotted lines in Fig. 2, push the head down between the rubber cushion and the ears and swing the free ends down to the desired position, shown by the solid lines in the same figure. The rearwardly-projecting upper part of the ears prevent the arms, which have an elliptical form in cross-section, from rising to escape through the opening between the rubber and the ears when the major axis of the arms occupies an approximately horizontal plane, as shown by the solid lines. When the thills are swung up to the perpendicular position shown by the dotted lines, the rubber cushions force the flatter sides of the arms against the V-shaped bearing upon the ears and serve to hold the thills in such position while the vehicle is being stored out of use, thus avoiding the necessity of separate appliances, such as have been commonly employed for such purpose. I also provide an ornamental plate or cover C, adapted to cover the upper side of the rubber and head to exclude dust and other extraneous matter.

The body part of the coupling is provided with a channel or groove C', and another groove $C^2$ is provided in the upper edges of the ear projections, and the plate is made to fill the space between such grooves and the respective edges of the plate adapted to enter and slide along such grooves. The plate is shown in position in Fig. 1, one edge of the plate being broken away to show one of the T-arms B'. The upper side of the plate is provided with a stud or finger-piece C³, by which the plate can be inserted or removed. The lower side of the plate is provided with a spring C⁴, riveted to the plate and adapted to bear down upon the rubber and body part of the coupling to prevent the plate from being accidentally detached by the vibration of the parts in use. The plate is also provided with a recess or opening C⁵ in the forward edge to receive the thill-iron when the thill is thrown up to a perpendicular position, as before explained. The bottom connecting-plate A³ is also provided with an opening A⁷ to permit the escape of any water which might gain access to the interior of the coupling.

I am aware that beveled T-shaped heads have been used on thill-irons to engage with similarly-beveled ears secured to an axle-clip; but the bearing-surfaces of the ears were rounded, and the bearing-surfaces on the heads had a slide movement upon the bearing-surfaces of the ears when the thills were subjected to the vibratory movement common to thills when in use. By having the bearing-surfaces of the ears V-shaped and the engaging bearing-surfaces of the T-shaped head in the form of a knife-edge the engaging bearing-surfaces will not slide one upon another, and the bearing-surfaces will be subjected to less wear.

What I claim as new, and desire to secure by Letters Patent, is—

1. In a thill-coupling, the ears having inner undercut V-shaped bearing-surfaces, in combination with the thill-iron having arms hook-shaped in lateral direction and V-shaped in transverse section, substantially as set forth.

2. In a thill-coupling, the combination of the ears having inner undercut V-shaped bearing-surfaces and connected at their lower edges by a plate, a cushion normally supported on said plate and adapted to bear against the end of the thill-iron both below and above its center, and a thill-iron provided with hook-shaped arms adapted to engage said bearing, and a cover movable in ways formed in the cushion-holder, substantially as set forth.

3. In a thill-coupling, the cushion-holder formed by ears and connecting-plate, the cushion normally resting on the said plate, and a spring-held cover for said holder, the cover-holding spring being interposed between said holding-spring and cushion, substantially as described.

4. In a thill-coupling, the combination, with a pair of ears connected at bottom by a plate having an inner bearing-surface and means for securing the ears to a vehicle, of a rubber cushion between such ears and normally supported on their connecting-plate and adapted to bear against the end of the thill-iron both above and below its center, a recessed cover-plate for securing the cushion between the ears, and a thill-iron having a T-shaped head, the arms of which are approximately elliptical in cross-section and adapted to engage with such cushion, substantially as described.

In testimony whereof I hereunto set my hand this 2d day of February, 1891.

J. O. FERGUSON.

Witnesses:
FRANK C. CURTIS,
CHAS. L. ALDEN.